US008086370B2

(12) United States Patent
Tollenaar

(10) Patent No.: US 8,086,370 B2
(45) Date of Patent: Dec. 27, 2011

(54) LOAD CONTROLLED STABILIZER SYSTEM

(75) Inventor: Eduard Tollenaar, Ede (NL)

(73) Assignee: NACCO

( * ) Notice: Subject to any disclaimer, the term of this patent is extended or adjusted under 35 U.S.C. 154(b) by 541 days.

(21) Appl. No.: 11/868,284

(22) Filed: Oct. 5, 2007

(65) Prior Publication Data

US 2009/0112409 A1 Apr. 30, 2009

(51) Int. Cl.

| | |
|---|---|
| ***G06F 7/70*** | (2006.01) |
| ***G06F 19/00*** | (2011.01) |
| ***B60G 17/018*** | (2006.01) |
| ***B60G 17/00*** | (2006.01) |
| ***B60G 17/0195*** | (2006.01) |

(52) U.S. Cl. ........... 701/36; 701/38; 701/50; 280/6.153; 187/222; 187/229

(58) Field of Classification Search ................ 701/1, 36, 701/37, 38, 39, 49, 50, 124; 280/5.5, 5.504, 280/5.513, 6.15, 6.153, 6.155, 6.159, 6.16; 187/222, 229, 390, 391; 37/411–413
See application file for complete search history.

(56) References Cited

U.S. PATENT DOCUMENTS

| | | | | |
|---|---|---|---|---|
| 6,202,013 | B1 | 3/2001 | Anderson et al. | |
| 6,477,455 | B2 * | 11/2002 | Panizzolo | 701/37 |
| 2004/0131458 | A1 | 7/2004 | Litchfield et al. | |
| 2007/0089925 | A1 | 4/2007 | Addleman | |

FOREIGN PATENT DOCUMENTS

| | | |
|---|---|---|
| DE | 1431696 | 1/1969 |
| WO | 0007925 | 2/2000 |

OTHER PUBLICATIONS

International Search Report and Written Opinion of International Application No. PCT/US08/078694, dated Feb. 5, 2009.
Hyster Reachstacker; Sales Brochure; Jul. 2007; pp. 1-19; Form No. 901113/2; Printed in England.

* cited by examiner

*Primary Examiner* — Tuan C. To
*Assistant Examiner* — Edward Pipala
(74) *Attorney, Agent, or Firm* — Stolowitz Ford Cowger LLP

(57) ABSTRACT

A stabilizer system for an industrial vehicle includes one or more stabilizer cylinders mounted to the industrial vehicle, wherein the stabilizer cylinders are configured to contact the ground when deployed. The stabilizer system further includes a pressure sensor configured to determine a hydraulic system pressure, and a processor configured to calculate a stabilizing pressure to be applied to the one or more stabilizer cylinders. The stabilizing pressure is based on the hydraulic system pressure in order to improve a forward stability of the industrial vehicle when the one or more stabilizer cylinders are deployed.

24 Claims, 6 Drawing Sheets

LOAD CONTROLLED STABILIZER SYSTEM

BACKGROUND

Industrial vehicles including construction and material handling trucks are typically required to transport and lift heavy loads. These loads may dramatically affect a balance or stability of the industrial vehicle during operation. To compensate for these effects on vehicle stability, various methods and systems may be employed to allow the vehicle to safely operate under these conditions. For example, dual drive tires may be mounted to the vehicle to improve side stability. Additional counterweight or a longer wheelbase may be provided to improve forward stability.

Some vehicles include stabilizers which can be provided at the front of the vehicle to improve vehicle stability. For example, some heavy duty construction vehicles include two hydraulic cylinders positioned on the frame in front of the drive axle, which extend when the stabilizer function is applied. The hydraulic cylinders are connected to the vehicle frame in order to exert a force on the ground, which lifts the front end of the vehicle, including the drive wheels, into the air.

By including the stabilizers in the front of the vehicle, a forward stability can be greatly improved. However, by removing the weight from the drive wheels, the side stability of the vehicle may be decreased. Reduced side stability combined with other factors such as windy weather conditions, an off-center load, or uneven terrain can present operational difficulties.

The present invention addresses these and other problems.

SUMMARY OF THE INVENTION

A stabilizer system for an industrial vehicle is disclosed as including one or more stabilizer cylinders mounted to the industrial vehicle, wherein the stabilizer cylinders are configured to contact the ground when deployed. The stabilizer system further includes a pressure sensor configured to determine a hydraulic system pressure, and a processor configured to calculate a stabilizing pressure to be applied to the one or more stabilizer cylinders. The stabilizing pressure is based on the hydraulic system pressure in order to improve a forward stability of the industrial vehicle when the one or more stabilizer cylinders are deployed.

An industrial vehicle is disclosed as comprising a drive wheel assembly located at a front end of the industrial vehicle, wherein the drive wheel assembly is in contact with the ground. The industrial vehicle further comprises one or more stabilizers mounted adjacent the drive wheel assembly, a lifting apparatus configured to lift a load, and one or more sensors configured to measure an operating condition of the lifting apparatus. A processor is configured to determine a stabilizing force of the one or more stabilizers based on the operating condition of the lifting apparatus, wherein the stabilizing force enables the one or more stabilizers to lift the front end of the vehicle while maintaining contact of the drive wheel assembly with the ground.

A method for stabilizing an industrial vehicle is disclosed. The method comprises determining a position of a load being transported by the industrial vehicle, measuring a weight of a load, and determining a load moment based on the position and the weight of the load. The method further comprises determining a stabilizing force to offset the load moment, and deploying one or more stabilizers to contact the ground with the stabilizing force.

A stabilizer system for an industrial vehicle is disclosed as including a stabilizer control assembly configured to control hydraulic operating pressure in the stabilizer system and one or more stabilizers mounted to the industrial vehicle. The one or more stabilizers are configured to contact ground when operating under a hydraulic stabilizer force. The stabilizer system further includes a hydraulic cylinder configured to lift a vehicle attachment when operating under a hydraulic lifting force, wherein the stabilizer control assembly is further configured to vary the hydraulic stabilizer force as a function of the hydraulic lifting force The foregoing and other objects, features and advantages of the invention will become more readily apparent from the following detailed description of a preferred embodiment of the invention which proceeds with reference to the accompanying drawings.

DETAILED DESCRIPTION

Figure 1:
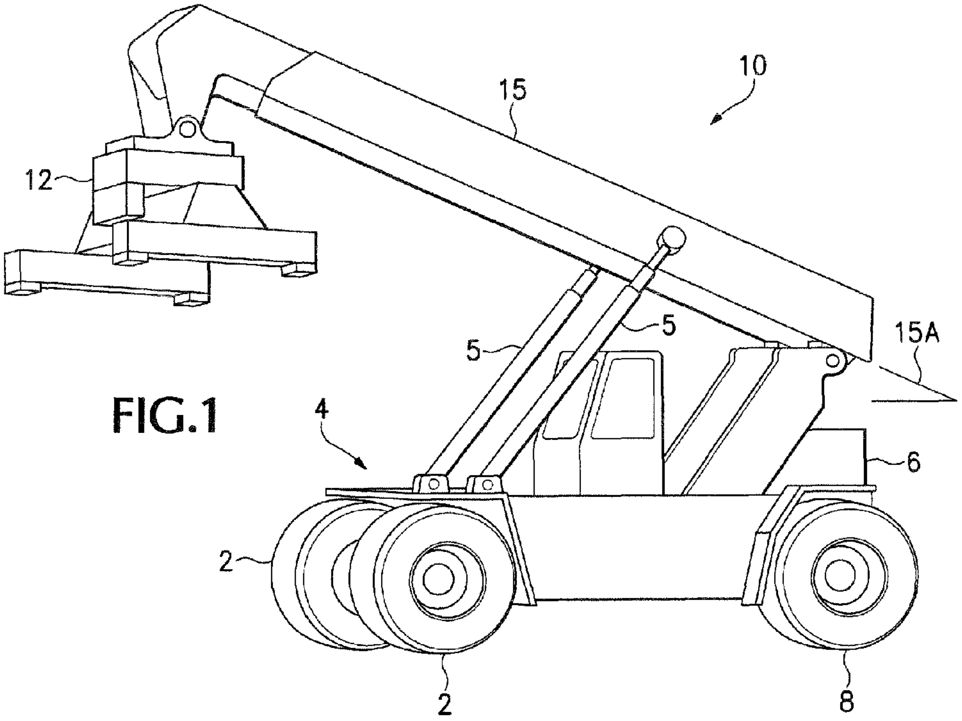
FIG. 1 illustrates an example industrial vehicle, such as a container handling truck.

FIG. 1 illustrates an example industrial vehicle 10, such as a container handling vehicle, forklift truck, construction vehicle, etc, which may use a novel stabilizer system as disclosed herein. The vehicle 10 may be used to transport loaded or unloaded containers, such as those found at a sea port or train depot. The vehicle 10 is shown as including drive wheels 2 mounted on the front end 4 of the vehicle 10. The drive wheels 2 may further include or belong to a drive wheel assembly including a drive axle. Steer wheels 8 are provided at an end of the vehicle 10 opposite the front end 4, or at the rear of the vehicle. Counterweight 6 may be provided at the rear of the vehicle 10 to provide or improve a forward stability of the vehicle 10.

The vehicle 10 is further illustrated as including a container handling attachment 12 mounted on an end of a boom 15. The attachment 12 may include a clamp, grapple, hook, scoop, shovel, fork, attachment pin or other types of apparatus capable of supporting a load or container. The boom 15 is able to extend and retract the position of the attachment 12 when handling a load. The boom angle 15A may be varied from an approximately horizontal position toward a vertical position by extending one or more derrick cylinders 5. In the manner, the attachment 12 may be raised and lowered, as well as extended and retracted. The derrick cylinders 5 may include one or more hydraulic actuated cylinders. Two derrick cylinders 5 are illustrated in FIG. 1.

Figure 2:
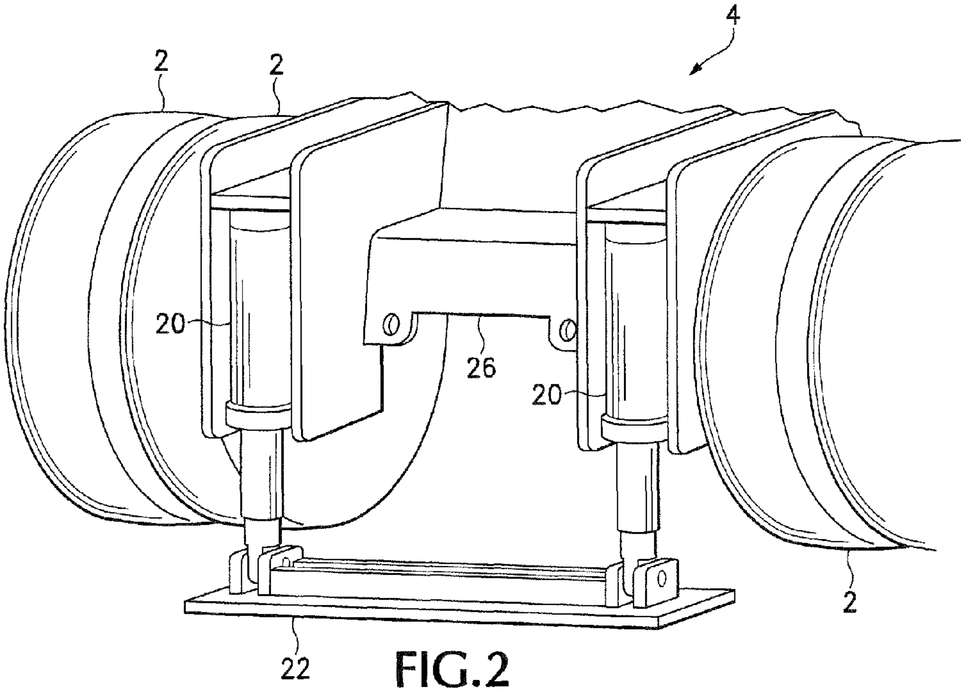
FIG. 2 illustrates the front end of the vehicle of FIG. 1, including an example stabilizer system.

FIG. 2 illustrates the front end 4 of the vehicle 10 of FIG. 1, including an example stabilizer system having two stabilizers 20 and a stabilizer footing 22. The stabilizers 20 may include one or more hydraulic actuated cylinders, such as those shown in FIG. 2. In one embodiment, separate stabilizer footings are provided for each of the stabilizers 20. The stabilizer system may include a frame 26 that supports the stabilizers 20 which can be rigidly positioned on the ground, terrain, or vehicle operating surface. The frame 26 may mount to or otherwise be located at the front end 4 of the vehicle 10.

The stabilizers 20 may be deployed when a load is being lifted in an extended position. For example, the boom 15 and attachment 12 may be extended up and away from the vehicle 10 in order to handle a load which is stacked or located in an elevated position. The stabilizers 20 may be extended such that the stabilizer footing 22 is pressed against the ground with a stabilizing force. Where the stabilizers 20 include one or more hydraulic cylinders, a hydraulic circuit may be employed that provides a hydraulic force to extend the hydraulic cylinders or hold the stabilizers 20 in a rigid position. The stabilizers 20 and stabilizer footing 22 may be located in front of the drive wheels 2 for improved forward stability of the vehicle 10.

An increased loading condition (for example as the attachment 12 is extended or the load weight increases) typically causes the drive wheels 2 to deflect and the front end 4 to lower. This results in a loss of forward stability of the vehicle 10 of FIG. 1. However, with the stabilizers 20 located in a rigid position and the stabilizer footing 22 pressing against the ground, any increased loading may be borne primarily or entirely by the stabilizers instead of by the drive wheels 2. This results in an improved forward stability, as compared to a vehicle with no stabilizers.

Figure 3A:
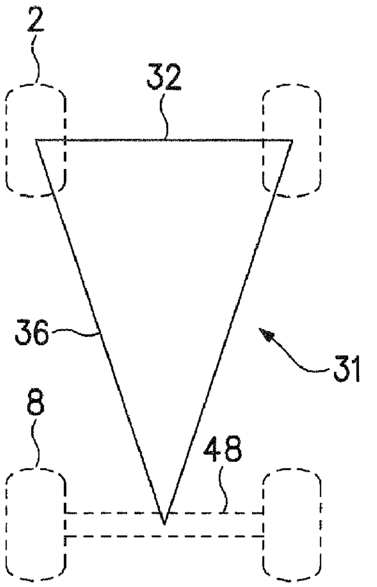
FIG.3A (PRIOR ART)
FIG. 3A illustrates a stability profile of a vehicle without stabilizers.

FIG. 3A illustrates a plan view of a stability profile 31 of a vehicle without stabilizers, as is known in the art. The stability profile 31 is a conceptual model used to determine or measure vehicle stability, and may also be referred to as a stability triangle. The stability profile 31 is provided for an industrial vehicle which has an articulating steer axle 48 connecting the steer tires 8. The stability profile 31 includes a side stability boundary line 36 and a forward stability boundary line 32. The forward stability boundary line 32 lies along an approximate centerline of the drive axle of the drive wheels 2. The side stability boundary line 36 lies along a line formed between the drive wheels 2 and the center of the steer axle 48. One skilled in the art would appreciate that a vehicle that does not have an articulating steer axle 48 may have other stability profiles, for example that more closely approximate a square or trapezoidal shape.

The stability profile 31 may be evaluated in the context of a three dimensional model of the vehicle, taking into account the elevated position or height of the vehicle center of gravity, as well as the load if any. To ensure vehicle stability, a projection of the combined center of gravity of the vehicle and load must remain within the confines of the stability profile 31. If the center of gravity crosses the forward stability boundary line 32, the vehicle will tip over in the longitudinal or forward direction. If the center of gravity crosses the side stability boundary line 36, the vehicle will tip over in the lateral or sideways direction.

Figure 3B:
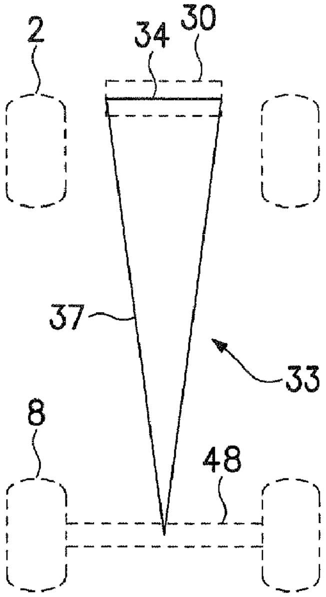
FIG.3B (PRIOR ART)
FIG. 3B illustrates a stability profile of a vehicle utilizing stabilizers.

FIG. 3B illustrates a stability profile 33 of a vehicle utilizing stabilizers 30 that lift the drive wheels 2 of the vehicle from the ground. The stability profile 33 includes a side stability boundary line 37 and a forward stability boundary line 34. The forward stability boundary line 34 lies along the stabilizers 30. By locating the stabilizers in front of the drive axle of the drive wheels 2, the forward stability boundary line 34 provides for an increased forward stability as compared with the forward stability boundary line 32 of FIG. 3A. Substantially all of the weight of the front end 4 (FIG. 1) is placed on the stabilizers 30, and the weight of the vehicle is removed from the drive wheels 2.

The side stability boundary line 37 of FIG. 3B lies along a line formed between one of the stabilizers 30 and the center of the steer axle 48 connecting the steer wheels 8. Because the distance between one of the stabilizers 30 is less than the distance between the two drive wheels 2, the effective area of the stability profile 33 may be significantly less than the effective area of the stability profile 31 of FIG. 3A. This may result in a loss of lateral or side stability about the side stability boundary line 37.

Figure 3C:
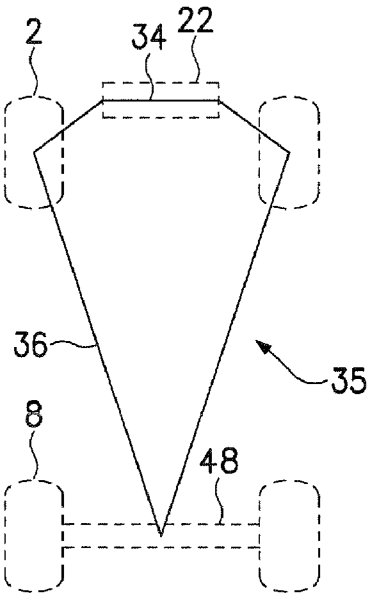
FIG. 3C illustrates an example stability profile of a vehicle utilizing an embodiment of a novel stabilizer system.

FIG. 3C illustrates an example stability profile 35 of a vehicle, such as vehicle 10 of FIG. 1, utilizing an embodiment of a novel stabilizer system. In one embodiment, the stabilizer system utilizes stabilizers 20 of FIG. 2 to lift less of the vehicle and load weight as compared to the stabilizers 30 described with respect to FIG. 3B, such that the drive wheels 2 remain in contact with the ground. In one embodiment, the drive wheels 2 maintain at least a minimum threshold drive axle force with the ground whether the vehicle 10 is in either of the loaded or unloaded condition.

The forward stability boundary line 34 of stability profile 35 lies along the stabilizer footing 22. By locating the stabilizer footing 22 in front of the drive axle of the drive wheels 2, the forward stability boundary line 34 provides for an increased forward stability as compared with the forward stability boundary line 32 of FIG. 3A. By maintaining the minimum threshold drive axle force with respect to the drive wheels 2, the side stability boundary line 36 of the stability profile 31 of FIG. 3A is also provided for the stability profile 35. Stability profile 35 combines the forward stability boundary line 34 with the side stability boundary line 36. The stability profile 35 may provide an increased forward stability similar as to that described for the stability profile 33 of FIG. 3B without sacrificing the larger side stability of the stability profile 31 of FIG. 3A.

Of the three stability profiles of FIGS. 3A, 3B, and 3C, the stability profile 33 provides the largest amount of vehicle stability in the longitudinal direction, about the forward stability boundary line 34. However the stability profile 33 also has the least amount of vehicle stability in the lateral direction, about the side stability boundary line 37. In order to generate the same longitudinal, or forward, stability provided by stability profile 33, additional counterweight could be added to the vehicle 10 described with respect to the stability profile 35 of FIG. 3C.

Figure 4:
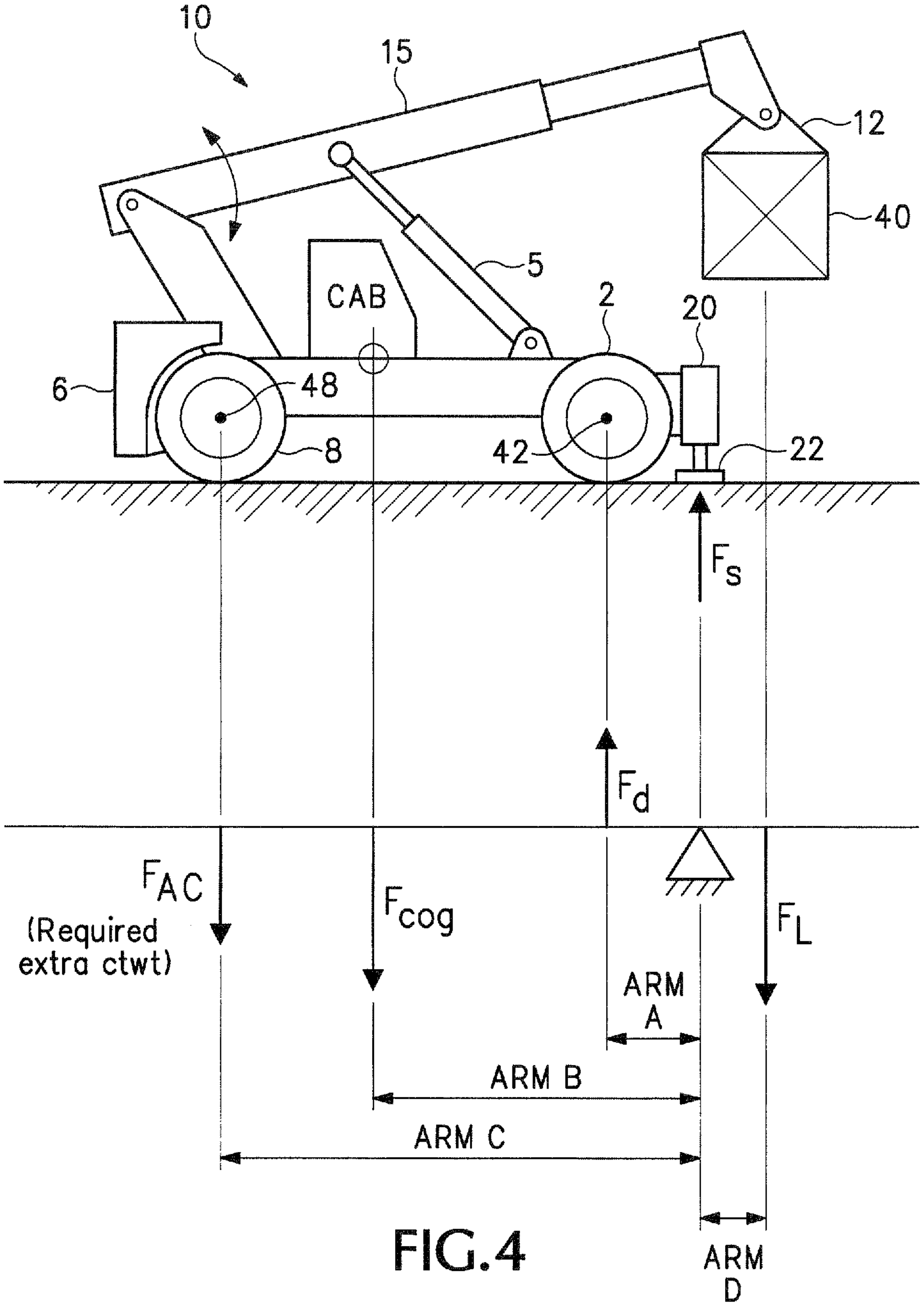
FIG. 4 is an example pictorial force diagram of the industrial vehicle of FIG. 1 including stabilizers.

FIG. 4 is an example pictorial force diagram of the vehicle 10 of FIG. 1 including stabilizers 20. The vehicle 10 is shown in a loaded condition, including a load 40 attached to the attachment 12. Comparisons of example forces and moments that may act on the vehicle 10 are provided to illustrate the operational differences between the various systems and embodiments described herein.

The following notation is used to describe the example forces and moments:

Fcog=Force center of gravity of the vehicle 10.

Fd=Drive axle reaction force acting on the drive wheels 2.

$F_L$=Force center of gravity of the load 40.

$F_{AC}$=Force center of gravity due to additional counterweight 6.

Arm A=Moment arm from the stabilizer footing 22 or stabilizers 20 to the drive axle 42. For illustrative purposes only, a dimension of 0.885 meters (m) is used for moment arm A.

Arm B=Moment arm from the stabilizer footing 22 or stabilizers 20 to the force center of gravity of the vehicle 10.

Arm C=Moment arm from the stabilizer footing 22 or stabilizers 20 to the steer axle 48. For illustrative purposes only, a dimension of 6.785 m is used for moment arm C.

Arm D=Moment arm from the stabilizer footing 22 or stabilizers 20 to the force center of gravity of the load 40. Moment arm D is understood as increasing in value when the boom 15 is extended in front of the vehicle 10.

$M_D$=Drive axle moment, calculated as the product of the drive axle reaction force acting on the drive wheels 2 and moment arm A. The drive axle moment $M_D$ may be understood as reducing the forward tipping stability of the vehicle 10.

$M_V$=Vehicle moment, calculated at the product of the force center of gravity of the vehicle 10 and the moment arm B.

$M_{AC}$=Counterweight moment, calculated as the product of the reaction force due to the additional counterweight 6 acting on the steer wheels 8 and moment arm C. The counterweight moments $M_{AC}$ may be understood as counteracting the drive axle moment $M_D$.

$M_L$=Load moment, calculated at the product of the force center of gravity of the load 40 and the moment arm D.

ΣM=Sum of Moments. The sum of moments equates to zero for a static analysis.

For example, $\Sigma M=M_V+M_D+M_L=(\text{Fcog}\times\text{Arm B})+(\text{Fd}\times\text{Arm A})+(F_L\times\text{Arm D})=0$. The sum of moments may be calculated to provide a forward tipping point of the vehicle 10.

Through experience and industry safety standards, the minimum threshold drive axle force acting through the drive wheels 2 of the vehicle 10 may be determined that provides for sufficient force to enable the side stability boundary line 36 of FIG. 3C. When the amount of weight acting on the drive wheels 2 is less than the minimum threshold drive axle force, the side stability boundary line 37 of FIG. 3B may instead result which would decrease the lateral stability of the vehicle 10. The amount of weight acting through the drive wheels 2 may be minimized when the vehicle 10 is operating in an unloaded condition, that is, without a load. The weight acting through the drive wheels 2 may further be decreased by fully retracting and elevating the boom 15. In one embodiment, the amount of force generated by the stabilizers 20 is calculated as the difference between the drive axle reaction force Fd of the vehicle 10 acting through the drive axle 48 and the minimum threshold drive axle force.

For illustrative purposes only, with reference again to FIG. 4, assume that the minimum threshold drive axle force equals 100,000 Newton (N) when the vehicle 10 is operating under any operating condition, either loaded or unloaded. Assume furthermore that the drive axle reaction force Fd acting on the drive wheels 2 is 300,000 N when the vehicle is operating in the unloaded condition. The difference between the drive axle reaction force Fd of 300,000 N and the minimum threshold drive axle force of 100,000 N results in the generation of a stabilizer force Fs of (300,000 N−100,000 N)×(5.9 m/6.785 m)=173,913 N.

In one embodiment, the stabilizers 20 are deployed when the vehicle 10 is in the unloaded condition, or when the boom 15 is in a retracted position. A boom extension lockout switch may be provided which disallows an extension of the boom 15 unless the stabilizers 20 have been deployed. By deploying the stabilizers 20 before extending the boom 15, an amount of tire deflection that may occur to the drive wheels 2 is reduced when the boom 15 is extended. Reducing the amount of tire deflection of the drive wheels 2 improves forward stability, and maintains the force center of gravity Fcog of the vehicle 10 within the stability profile 35 of FIG. 3C when the boom 15 is extended.

Now assume that the drive axle reaction force Fd acting on the drive wheels 2 is 1,000,000 N when the vehicle 10 is operating in a loaded condition, for example when the boom 15 and load 40 is extended. Assume furthermore, that the stabilizers 20 were not deployed when the vehicle 10 was operating in an unloaded condition, but rather when the load 40 was already in an extended position. If the stabilizers 20 are set to provide the stabilizer force Fs of 173,913 N according to the unloaded condition requirements, then the drive axle reaction force Fd after the stabilizers 20 are applied may be calculated as ((1,000,000 N×(6.785 m−0.885 m))+(−173,913 N×6.785 m))/(6.785 m−0.885 m))=800,000 N. This 800,000 N of force may cause the drive wheels 2 to undergo significantly more tire deflection than if the stabilizers 20 had instead been deployed prior to handling the load 40 or extending the boom 15. The stabilizer force Fs of 173,913 N may be insufficient to fully alleviate the tire deflection. The increased tire deflection decreases the longitudinal stability of the vehicle 10, and may result in additional counter weight 6 being used. The additional counterweight 6 required may be calculated as follows:

$$M_D=M_{AC}$$

$$Fd\times\text{Arm }A=F_{AC}\times\text{Arm }C$$

$$800{,}000\ N\times 0.885\ m=F_{AC}\times 6.785\text{ m}$$

$$F_{AC}=800{,}000\ N\times 0.885\ m/6.785\ m)=104{,}348\ N,\text{ or } 10{,}648\text{ kg.}$$

In order to provide the same longitudinal or forward stability provided by the stabilizers 30 of FIG. 3B, an additional counterweight 6 of 10,648 kilograms needs to be provided at the steer axle 48.

FIG. 5 illustrates an example hydraulic circuit of a novel stabilizer system 50. The stabilizer system 50 may include one or more stabilizer cylinders or stabilizers 20 mounted to the front end 4 of the vehicle 50. The stabilizers 20 may be configured to contact the ground when deployed. The stabilizer system may include a pressure sensor S1 configured to determine a hydraulic system pressure. In one embodiment, the pressure sensor measures a hydraulic pressure in the derrick cylinders 5. The stabilizer system 50 may further include an embedded controller or processor 55 configured to calculate a stabilizing pressure to be applied to the one or more stabilizers 20 based on the hydraulic system pressure in order to improve a forward stability of the vehicle 10 when the one or more stabilizers are deployed.

The stabilizing pressure may be calculated to provide the one or more stabilizers 20 with sufficient force to lift the front end 4 of the vehicle 10 while maintaining contact of the two or more drive wheels 2 with the ground. The two or more drive wheels 2 may maintain at least a predetermined minimum threshold reaction force with the ground during deployment of the one or more stabilizers.

In one embodiment, the stabilizer system 50 includes a position sensor S2 configured to determine a distance that the boom 15 of FIG. 1 is extended. The processor 55 may be configured to calculate the stabilizing pressure based on the distance of the boom extension. The hydraulic system pressure may vary during operation of the vehicle 10 according to the distance that the boom 15 is extended. The stabilizer system 50 may include an angular sensor S3 configured to determine the boom angle 15A (FIG. 1) of the boom 15. The processor 55 may be configured to calculate the stabilizing pressure based on the boom angle 15A.

Figure 5A:
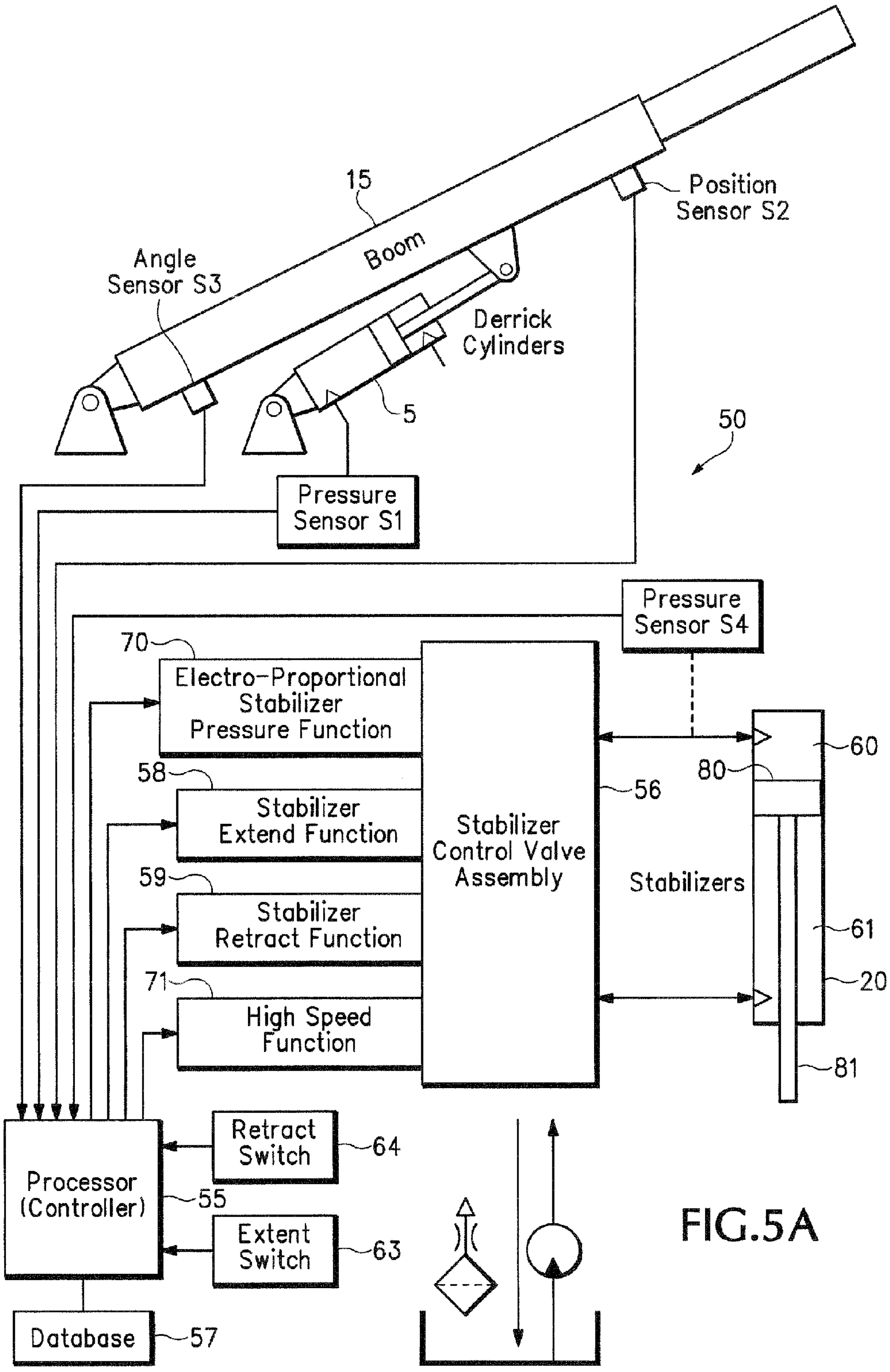
FIG. 5A illustrates an example hydraulic circuit of an embodiment of a novel stabilizer system.

FIG. 5*a* illustrates an example hydraulic circuit of an embodiment of a novel stabilizer system 50. The stabilizer system 50 may include one or more stabilizer cylinders or stabilizers 20 mounted to the front end 4 of the vehicle 10. The stabilizers 20 may be configured to contact the ground when deployed. The stabilizer system 50 may include a stabilizer control valve assembly 56, which includes a stabilizer extend function 58, a stabilizer retract function 59, and a stabilizer pressure function 70. The stabilizer control valve assembly 56 may further include a high speed function 71. The stabilizer system 50 may include a pressure sensor S1 configured to determine a hydraulic system pressure. In one embodiment, the pressure sensor S1 measures a hydraulic pressure in the derrick cylinders 5. The stabilizer system 50 may further include an embedded controller or processor 55 configured to calculate a stabilizer pressure 60 to be applied to the stabilizers 20 based on the hydraulic system pressure in order to improve a forward stability of the vehicle 10 when the one or more stabilizers 20 are deployed.

The stabilizing pressure may be determined or calculated to provide the stabilizers 20 with sufficient force to lift the front end 4 of the vehicle 10 while maintaining contact of the two or more drive wheels 2 with the ground. The two or more drive wheels 2 may maintain at least a predetermined minimum threshold reaction force with the ground during deployment of the stabilizers 20. The stabilizer system may include an electro-proportional stabilizer pressure function 70 that limits the hydraulic system pressure to a calculated or determined stabilizer pressure 60. In one embodiment, the stabilizer pressure is stored in a look-up table or database, such as database 57, which may further be associated with or correspond to input values from the sensors S1, S2 and S3.

The stabilizer system 50 may include a position sensor S2 configured to determine a distance that the boom 15 of FIG. 1 is extended. The processor 55 may be configured to calculate the stabilizer pressure 60 based on the distance of the boom extension. The hydraulic system pressure may vary during operation of the vehicle 10 according to the distance that the boom 15 is extended. The stabilizer system 50 may include an angular sensor S3 configured to determine the boom angle 15A (FIG. 1) of the boom 15. The processor 55 may be configured to calculate the stabilizer pressure 60 based on the boom angle 15A. The processor 5 may further be configured to calculate or determine the stabilizer pressure 60 according to the combined input of two or more of the sensors S1, S2 and S3. A stabilizer pressure sensor S4 may be provided to determine when the hydraulic pressure in the stabilizers 20 has reached the stabilizer pressure 60.

Applying the Stabilizers

1. Operator presses stabilizer extend switch 63

2. Processor 55 checks the operating condition of the vehicle 10. For example, the processor 55 may check the vehicle travel speed, transmission and park brake status before activating the stabilizers 20. In one embodiment, the stabilizers 20 may only be applied when the vehicle travel speed is zero, the transmission is in neutral, and the park brake is activated.

3. Processor 55 determines a loading condition of the vehicle 10. For example, pressure sensor S1 may measure or transmit the hydraulic system pressure of the derrick cylinders 5. Position sensor S2 may measure or transmit the load position according to the extended distance of the boom 15. Angular sensor S3 may measure or transmit the load position according to the angular position of the boom 15.

4. Processor 55 calculates a minimum threshold stabilizing pressure corresponding to the loading condition of the vehicle 10. In one embodiment, the minimum threshold stabilizing pressure is a pressure that, when applied, will produce the minimum threshold drive axle force Fs (FIG. 4).

5. Processor 55 applies a proportional control current to the electro-proportional stabilizer pressure function 70 corresponding to a target minimum threshold stabilizing pressure, or stabilizer pressure 60. Hydraulic pressure is applied to the stabilizers 20 until the stabilizer pressure 60 is achieved. The stabilizer pressure function 70 automatically limits the hydraulic pressure supplied to the stabilizers 20, for example according to feedback from the stabilizer pressure sensor S4.

6. When a stabilizer pressure 60 in the stabilizers 20 equals the calculated stabilizing pressure for a period of time, the processor 55 generates a signal that indicates that the stabilizers 20 are positioned correctly.

7. Operator releases the stabilizer extend switch 63.

8. Processor 55 turns off a proportional control current to the electro-proportional stabilizer pressure function 70 and turns off the stabilizer extend function 58 of the stabilizer control valve assembly 56. The connections to the stabilizers 20 may be blocked, preventing flow to and from the stabilizers 20.

9. The stabilizers 20 may remain extended at a fixed position or by applying the minimum threshold stabilizing force.

10. A Load Moment Indicator (LMI) system may be provided to determine a maximum allowable load based on sensor input and the operating condition of the vehicle 10 with the stabilizers 20 extended. In one embodiment, the LMI includes one or more charts, look-up tables or databases, such as database 57, which includes maximum allowable loads as a function of boom angle, position, or operating pressure. The LMI may interpolate data points provided in the database 57 to determine an interpolated maximum allowable load. The database 57 may include separate charts or look-up tables for the vehicle 10 both with and without the stabilizers 20 extended.

Retracting the Stabilizers

1. Operator presses a stabilizer retract switch 64.

2. Processor 55 identifies the loading condition and determines if the center of gravity of the vehicle 10 is within the stability profile, for example stability profile 31 of FIG. 3A.

3. The LMI system determines a maximum allowable load based on sensor input and the operating condition of the vehicle 10 with the stabilizers 20 retracted.

4. Processor 55 applies a control current to the stabilizer retract function 59 of the stabilizer control valve assembly 56 to open the necessary flow paths to retract the stabilizers 20 until a stabilizing retract pressure 61 is achieved or the stabilizers 20 are fully retracted. A position switch or sensor may be provided to determine the position of the stabilizers 20.

5. When the stabilizers 20 are fully retracted, the processor 55 may provide a signal to the operator to indicate the process has been completed.

6. Operator releases retract switch 64.

7. Processor 55 turns off the stabilizer retract function 59. The connections to stabilizers 20 may be blocked, preventing hydraulic flow to and from the stabilizers 20.

8. The stabilizers 20 may be fully retracted and locked in a retracted position.

A high speed function 71 may be used to increase the extension speed of the stabilizers 20. Oil pushed out of the rod side 81 of the stabilizers 20 when the stabilizers are being extended can be recycled to the base end 80 of the stabilizers 20. The base end 80 may include a piston. The high speed function 71 may be energized or activated during application of the stabilizers 20 by processor 55.

When the stabilizers 20 are operating in a high speed mode, the stabilizer pressure 60 may effectively act only on the rod end 81, instead of the base end 80. The processor 55 may calculate a higher stabilizer pressure to achieve the same down force on the stabilizers 20 as when the stabilizer system 50 is operating in a normal speed mode.

In one embodiment, the stabilizer system 50 is configured to vary the force of the stabilizers 20 such that, when applied, the drive axle reaction force Fd acting on the drive axle 42 of FIG. 4 is constant, independent of the loading condition of the vehicle 10. The stabilizer system 50 may be configured to operate similarly as the previous example of applying a stabilizer force Fs of 173,913 N when the vehicle 10 is operating in an unloaded condition. However, when the vehicle 10 is operating in a loaded condition, instead of applying the same stabilizer force Fs of 173,913 N, the processor 55 may instead calculate an increased stabilizer force Fs to compensate for the increased amount of tire deflection of the drive wheels 2. The processor 55 may take into consideration a hydraulic operating pressure, for example of the derrick cylinders 5, or a position of the load 40, for example according to the extended distance of the boom or the boom angle 15A of FIG. 1.

The stabilizer force Fs to be applied to the stabilizers 20 may be calculated based on various vehicle operating conditions. In one embodiment, a hydraulically linked solution is provided, in which the pressure commanded in the stabilizers 20 is related to the pressure measured in the derrick cylinders 5. The hydraulic pressure in the derrick cylinders 5 may be used as a rough approximation of the stabilizer force Fs that is applied by the stabilizers 20 to compensate for the drive axle reaction force acting on the drive wheels 2. The stabilizer force Fs may be calculated as a predetermined percentage or ratio of the hydraulic pressure in the derrick cylinders 5. In one embodiment, the stabilizer force Fs is approximately 80% of the hydraulic pressure measured in the derrick cylinders 5.

In a further embodiment a load moment indicator system (LMI) is configured to control the stabilizer pressure 60. The LMI may include the processor 55, database 57 and any of the pressure sensor S1, the position sensor S2 and the angle sensor S3 of FIG. 5A to calculate the drive axle reaction force Fd acting on the drive axle 42, and subsequently the stabilizer force Fs of FIG. 4. The processor 55 may be configured to calculate the required pressure to generate the stabilizer force Fs to ensure the remaining dive axle reaction force Fd is sufficient to maintain side stability of the vehicle 10. The LMI may provide a constant dive axle reaction force Fd with a marginal tolerance.

Returning to the example force diagram of FIG. 4, where we assume that the minimum threshold drive axle force equals 100,000 Newton (N) when the vehicle 10 is operating under any operating condition. However, with reference to the stabilizer system 50 of FIG. 5, the processor 55 is configured to calculate the amount of stabilizer force Fs that results in the minimum threshold drive axle force of the vehicle 10. In this case, the additional counterweight 6 required may be calculated as follows:

$$M_D = M_{AC}$$

$$100{,}000\ N \times \text{Arm } A = F_{AC} \times \text{Arm } C$$

$$100{,}000\ N \times 0{,}885\ m = F_{AC} \times 6.785\ m$$

$$F_{AC} = 100{,}000\ N \times 0.885\ m / 6.785\ m = 13{,}043\ N, \text{ or } 1330\ kg.$$

In order to provide the same longitudinal or forward stability provided by the stabilizers 30 of FIG. 3B, an additional counterweight 6 of 1330 kilograms needs to be provided at the steer axle 48. This is significantly less than the additional amount of counterweight 6 that was needed with the stabilizers 30 of FIG. 3B, in which 10,648 kilograms were required.

While increasing the drive axle reaction force Fd on the drive axle 42 improves side stability, it reduces the forward stability of the vehicle 10. By calculating the stabilizer force Fs according to the vehicle operating conditions, a lower maximum drive axle reaction force Fd may be placed on the drive axle 42, thereby increasing a forward stability of the vehicle 10 and maintaining the improved side stability. The stabilizer force Fs may therefore be determined such that the drive axle reaction force Fd will be equal to the minimum threshold drive axle force when the load 40 is released and the vehicle 10 is operating in the unloaded condition. Regardless of when the stabilizer force Fs is applied, the drive axle reaction force Fd provides the minimum threshold drive axle reaction force. As a result, the boom 15 may be extended prior to deploying the stabilizers 20, and the desired forward and side stability may still be achieved.

Figure 5B:
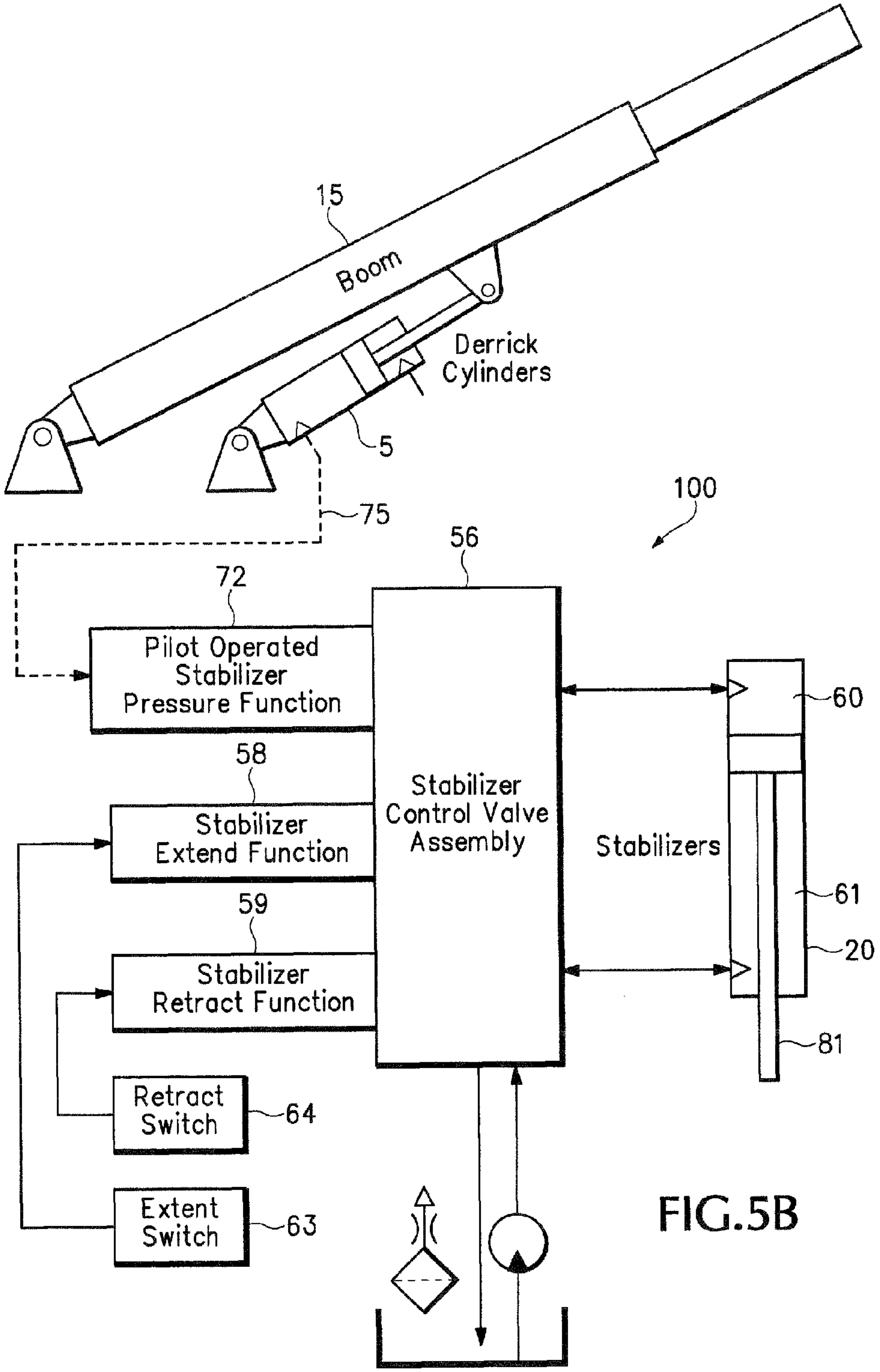
FIG. 5B illustrates an example hydraulic circuit of a further embodiment of a novel stabilizer system.

FIG. 5B illustrates an example hydraulic circuit of a further embodiment of a novel stabilizer system 100. The stabilizer system 100 may include a stabilizer function 72 operated by a pilot pressure line 75, to limit the stabilizer pressure 60 of the stabilizers 20. The pilot pressure line 75 may limit the stabilizer pressure according to one or more hydraulic system pressures of the vehicle 10. The hydraulic system pressures may in turn be related to the loading condition of the vehicle 10, for example according to the hydraulic pressure inside the derrick cylinders 5. The stabilizer pressure 60 applied to the one or more stabilizers 20 may be equal to, or a fixed percentage of, a hydraulic pressure inside the derrick cylinders 5. The pilot pressure line 75 and stabilizer function may automatically vary the stabilizer pressure 60 as a function of the hydraulic pressure in the derrick cylinders 5.

The stabilizer system 50, 100 may provide an equivalent side and forward stability of the vehicle as compared to maximum stability values of vehicles employing stabilizers configured to exert a fixed stabilizer force that lifts the front end of a vehicle. Furthermore, the stabilizer system 50 accomplishes this using less counterweight 6. Less counterweight 6 decreases the cost of the vehicle 10, reduces tire wear on the steer wheels 8 due to reduced wheel loading, increases fuel efficiency, and improves vehicle handling.

Figure 6:
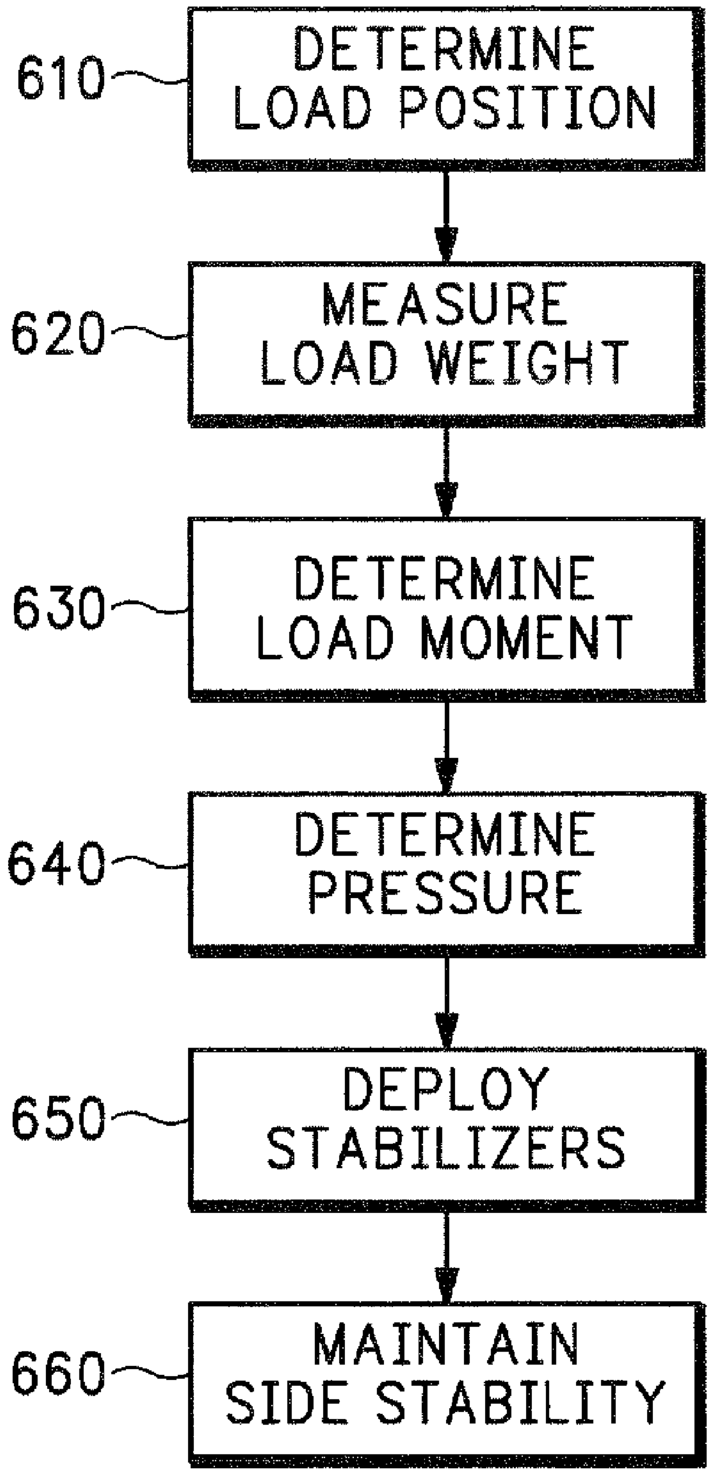
FIG. 6 illustrates an example method of implementing a load stabilizer system.

FIG. 6 illustrates an example method of implementing a novel load stabilizer system. In one embodiment, the various operations may be performed by the processor 55 of FIG. 5A.

At operation 610, a position of the load being transported by an industrial vehicle is determined. The position of the load may be determined according to one or both of an extended position of the load and an angle of a vehicle boom, for example.

At operation 620, a weight of a load is measured. In one embodiment, the weight of the load may be determined according to a hydraulic pressure, for example in one or more derrick cylinders.

At operation 630, a vehicle load moment is calculated based on the position and the weight of the load. In one embodiment, the load moment includes the weight of one or more of the boom 15, the attachment 12, and the load 40 (FIG. 4).

At operation 640, a stabilizing force is calculated to offset the load moment. The stabilizing force may be calculated to maintain contact of a vehicle drive wheel assembly to the ground when the one or more stabilizers are deployed. In one embodiment, the stabilizing force is calculated to maintain a minimum threshold axle reaction of the vehicle drive wheel assembly when the load is released.

At operation 650, the one or more stabilizers are deployed to contact ground using the stabilizing force. In one embodiment, the stabilizers are deployed near a front end of the industrial vehicle. If no load is detected prior to deploying the stabilizers, a lower stabilizing force may be applied as compared to if a load is first detected.

In one embodiment, the stabilizing force is continuously varied according to the calculated load moment. The stabilizing force may be provided for or augmented by an accumulator which provides a hydraulic spring function. The stabilizing force may be varied in real-time by a processor or the accumulator, so that the stabilizing force automatically compensates for any change in load weight or position as it occurs.

The system and apparatus described above can use dedicated processor systems, micro-controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A stabilizer system for an industrial vehicle, comprising:

one or more stabilizer cylinders mounted to an end of the industrial vehicle, wherein the stabilizer cylinders are configured to contact ground when deployed and to increase a longitudinal stability of the industrial vehicle;

a pressure sensor configured to determine a hydraulic system pressure; and a processor configured to calculate a stabilizing pressure to be applied to the one or more stabilizer cylinders based on the hydraulic system pressure and a predetermined threshold axle reaction force associated with an axle of the industrial vehicle, wherein the predetermined threshold axle reaction force is based on a minimum lateral stability of the industrial vehicle, and wherein in response to applying the stabilizing pressure to the one or more stabilizer cylinders:

the end of the industrial vehicle is lifted off the ground;

an axle reaction force acting on the axle is reduced to the predetermined threshold axle reaction force;

the longitudinal stability is increased; and a lateral stability of the industrial vehicle is decreased while maintaining the minimum lateral stability.

2. The stabilizer system according to claim 1, further comprising a position sensor configured to determine a distance that a boom is extended, wherein the processor is further configured to calculate the stabilizing pressure based on the distance.

3. The stabilizer system according to claim 2, wherein the hydraulic system pressure undergoes a change in pressure during operation of the industrial vehicle according to the distance that the boom is extended, and wherein the stabilizing pressure varies as a function of the change in pressure of the hydraulic system pressure.

4. The stabilizer system according to claim 2, further comprising an angular sensor configured to determine an angle of the boom in an extended position, wherein the processor is further configured to calculate the stabilizing pressure based on the angle.

5. The stabilizer system according to claim 1, wherein the stabilizing pressure is calculated to provide the one or more stabilizer cylinders with sufficient force to lift the end of the industrial vehicle while maintaining contact of two or more vehicle drive wheels with the ground, wherein the axle comprises a non-articulating axle, wherein the two or more vehicle drive wheels are connected to the non-articulating axle located at the end of the industrial vehicle, wherein the one or more stabilizer cylinders are located between the two or more vehicle drive wheels, and wherein the minimum lateral stability of the industrial vehicle is determined about a lateral stability profile formed between a stabilizer footing, the two or more vehicle drive wheels, and a centerline of an articulating axle located at an opposite end of the industrial vehicle.

6. The stabilizer system according to claim 4, wherein applying the stabilizing pressure to the one or more stabilizer cylinders transfers a portion of vehicle weight from the axle to the one or more stabilizer cylinders, and wherein the portion of vehicle weight supported by the axle decreases until the predetermined minimum threshold axle reaction force acts on the axle.

7. An industrial vehicle comprising:

a non-articulating axle located at one end of the industrial vehicle;

a drive wheel assembly mounted on the non-articulating axle, wherein the drive wheel assembly is configured to make contact with ground and support a portion of weight of the industrial vehicle;

one or more stabilizers mounted adjacent to the non-articulating axle and configured to improve a longitudinal stability of the industrial vehicle;

a lifting apparatus configured to lift a load;

one or more sensors configured to measure an operating condition of the lifting apparatus;

an articulating axle located at an opposite end of the industrial vehicle, wherein the articulating axle comprises a pivot point about which the opposite end of the industrial vehicle articulates in a lateral direction, and a processor configured to determine a stabilizing force of the one or more stabilizers based on the operating condition of the lifting apparatus and a threshold axle reaction force associated with the drive wheel assembly, wherein the threshold axle reaction force is based on a minimum lateral stability of the industrial vehicle determined about a lateral stability profile formed between the drive wheel assembly, the one or more stabilizers, and the pivot point of the articulating axle, and wherein the stabilizing force, when applied to the one or more stabilizers, operates to:

lift the end of the industrial vehicle while the drive wheel assembly maintains contact with the ground;

decrease the portion of weight supported by the drive wheel assembly as the end is lifted until the threshold axle reaction force is achieved;

increase the longitudinal stability; and decrease a lateral stability of the industrial vehicle while maintaining the minimum lateral stability.

8. The industrial vehicle according to claim 7, wherein the one or more sensors comprise a position sensor configured to determine a distance that the lifting apparatus is extended, and wherein the operating condition of the lifting apparatus comprises the distance that the lifting apparatus is extended.

9. The industrial vehicle according to claim 7, wherein the one or more sensors include a pressure sensor configured to determine a hydraulic system pressure of the lifting apparatus, and wherein the operating condition of the lifting apparatus comprises the hydraulic system pressure of the lifting apparatus.

10. The industrial vehicle according to claim 9, wherein the hydraulic system pressure varies during operation of the industrial vehicle according to a distance that the lifting apparatus is extended.

11. The industrial vehicle according to claim 8, wherein the one or more sensors further comprise an angular sensor configured to determine an angle of the lifting apparatus in the extended position, and wherein the processor is further configured to determine the stabilizing force based on the angle of the lifting apparatus in the extended position.

12. The industrial vehicle according to claim 7, further comprising a hydraulic device configured to apply hydraulic pressure to the one or more stabilizers, wherein the hydraulic pressure corresponds to the stabilizing force, and wherein the drive wheel assembly comprises two or more drive wheels located at the end of the industrial vehicle.

13. The industrial vehicle according to claim 12, wherein the two or more drive wheels maintain at least the threshold axle reaction force with the ground during deployment of the one or more stabilizer cylinders, and wherein the one or more stabilizers are mounted between the two or more drive wheels.

14. A method for stabilizing an industrial vehicle comprising:

determining a position of a load being transported by the industrial vehicle;

measuring a weight of the load;

determining a load moment based on the position and the weight of the load;

determining a stabilizing force based on the load moment and a threshold axle reaction force associated with a non-articulating axle located at a first end of the industrial vehicle, wherein the industrial vehicle comprises two or more wheels connected to the non-articulating axle, wherein a lateral stability profile is formed between the two or more wheels, one or more stabilizers, and a pivot point of an articulating axle located at a second end of the industrial vehicle opposite the first end, and wherein the threshold axle reaction force is based on a minimum lateral stability of the industrial vehicle determined about the lateral stability profile; and deploying the one or more stabilizers with the stabilizing force to cause the first end of the industrial vehicle to lift up, wherein the one or more stabilizers are configured to improve a longitudinal stability of the industrial vehicle, wherein the threshold axle reaction force acts on the two or more wheels in order to increase the longitudinal stability and decrease a lateral stability of the industrial vehicle while maintaining the minimum lateral stability, and wherein the one or more stabilizers are positioned substantially between the two or more wheels connected to the non-articulating axle.

15. The method according to claim 14, wherein the stabilizing force is determined to maintain contact of the two or more wheels with ground when the one or more stabilizers are deployed.

16. The method according to claim 14, further comprising releasing the load, wherein the stabilizing force is determined to maintain the threshold axle reaction force acting on the two or more wheels after the load is released, and wherein the one or more stabilizers remain deployed with the stabilizing force after the load is released.

17. The method according to claim 14, wherein the stabilizing force varies as a function of the load moment.

18. The method according to claim 14, wherein the stabilizing force is continuously varied according to the determined load moment.

19. The method according to claim 18, wherein the stabilizing force is varied in real-time.

20. A stabilizer system for an industrial vehicle comprising:

a stabilizer control assembly configured to control hydraulic operating pressure in the stabilizer system, wherein the stabilizer control assembly comprises a pilot pressure line;

one or more stabilizers mounted to a first end of the industrial vehicle and adjacent a non-articulating axle with drive wheels mounted thereon to improve a longitudinal stability of the industrial vehicle, wherein the one or more stabilizers are configured to lift the first end of the industrial vehicle while maintaining the drive wheels in contact with ground when operating under a hydraulic stabilizer force, and wherein a lateral stability profile is formed between the drive wheels, a stabilizer footing, and a pivot point of an articulating axle located at a second end of the industrial vehicle opposite the first end; and a hydraulic cylinder configured to lift a vehicle attachment when operating under a hydraulic system pressure, wherein the hydraulic cylinder is connected to the stabilizer control assembly via the pilot pressure line, wherein the stabilizer control assembly is further configured to vary the hydraulic stabilizer force as a fixed percentage of the hydraulic system pressure in the hydraulic cylinder, and wherein the fixed percentage is based on a minimum lateral stability of the industrial vehicle determined about the lateral stability profile.

21. The stabilizer system according to claim 20, wherein the hydraulic stabilizer force equals the hydraulic system pressure.

22. The stabilizer system according to claim 20, wherein the fixed percentage of the hydraulic system pressure is predetermined.

23. The stabilizer system according to claim 20, wherein the stabilizer control assembly is configured to automatically vary the hydraulic stabilizer force to maintain a predetermined minimum threshold axle reaction force on the drive wheels.

24. The stabilizer system according to claim 20, wherein the stabilizer control assembly is further configured to vary the hydraulic stabilizer force to maximize the longitudinal stability while maintaining at least the minimum lateral stability of the industrial vehicle.

* * * * *

UNITED STATES PATENT AND TRADEMARK OFFICE

CERTIFICATE OF CORRECTION

PATENT NO. : 8,086,370 B2
APPLICATION NO. : 11/868284
DATED : December 27, 2011
INVENTOR(S) : Eduard Tollenaar It is certified that error appears in the above-identified patent and that said Letters Patent is hereby corrected as shown below:

Title page, column 1, item (73), "Assignee": Delete "NACCO" and insert -- NMHG Oregon, LLC, Portland, OR (US) --.

Signed and Sealed this
Fifth Day of March, 2013

Teresa Stanek Rea
*Acting Director of the United States Patent and Trademark Office*